US 8,084,886 B2

(12) United States Patent
Hirahara

(10) Patent No.: US 8,084,886 B2
(45) Date of Patent: Dec. 27, 2011

(54) UNINTERRUPTIBLE POWER SUPPLY APPARATUS

(75) Inventor: Minoru Hirahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 434 days.

(21) Appl. No.: 12/285,730

(22) Filed: Oct. 14, 2008

(65) Prior Publication Data

US 2009/0129128 A1 May 21, 2009

Related U.S. Application Data

(63) Continuation-in-part of application No. 11/698,112, filed on Jan. 26, 2007, now abandoned.

(30) Foreign Application Priority Data

Mar. 28, 2006 (JP) ................................. 2006-088676

(51) Int. Cl.
*H02J 9/00* (2006.01)
*H02J 9/02* (2006.01)
*H02J 9/04* (2006.01)

(52) U.S. Cl. ................ 307/64; 307/66; 307/85; 307/86; 307/87

(58) Field of Classification Search .............. 307/64–66, 307/85–87

See application file for complete search history.

(56) References Cited

U.S. PATENT DOCUMENTS

| 5,440,441 | A | 8/1995 | Ahuja | 361/62 |
| 5,499,154 | A | 3/1996 | Cullison | 361/18 |
| 5,612,580 | A | 3/1997 | Janonis | 307/64 |
| 5,726,849 | A | 3/1998 | Nakamura | 361/93 |
| 5,818,670 | A | 10/1998 | Ahn | 361/18 |
| 6,094,362 | A | 7/2000 | Domingo | 363/21 |
| 6,105,146 | A | 8/2000 | Tavallaei et al. | 714/2 |
| 6,259,371 | B1 | 7/2001 | Chang | 340/659 |
| 6,295,215 | B1 | 9/2001 | Faria et al. | 363/37 |
| 6,577,513 | B1 | 6/2003 | Chang et al. | 363/37 |
| 6,629,247 | B1 | 9/2003 | Hall et al. | 713/306 |
| 6,643,152 | B2 | 11/2003 | Tokunaga et al. | 363/89 |
| 6,691,248 | B1 | 2/2004 | Nishijima et al. | 714/14 |
| 7,049,711 | B2 | 5/2006 | Kanouda et al. | 307/66 |
| 7,053,502 | B2 | 5/2006 | Aihara et al. | 307/46 |
| 7,113,379 | B2 | 9/2006 | Matsumoto | 361/57 |

(Continued)

FOREIGN PATENT DOCUMENTS

JP 6-67767 3/1994

(Continued)

OTHER PUBLICATIONS

Japanese Office Action mailed Jul. 21, 2009, including an English-language translation.

*Primary Examiner* — Jared Fureman
*Assistant Examiner* — Adi Amrany
(74) *Attorney, Agent, or Firm* — Kratz, Quintos & Hanson, LLP.

(57) ABSTRACT

An uninterruptible power supply device connects a battery for power-outage backup to the output side of an AC/DC converter. An input monitoring circuit monitors alternating current input of the AC/DC converter and outputs an alternating current input monitor signal E1. An output monitoring circuit monitors the direct current output of the AC/DC converter and outputs a direct current output monitor signal E2. A reactivation circuit outputs a reset signal to and reactivates protection circuits of the AC/DC converter when the state that alternating current input is provided and direct current output is not provided is determined based on the alternating current input monitor signal E1 and the direct current output monitor signal E2 upon turn-on of alternating current power.

7 Claims, 9 Drawing Sheets

U.S. PATENT DOCUMENTS

| | | | |
|---|---|---|---|
| 7,129,677 B2 | 10/2006 | Fu et al. | 323/89 |
| 2003/0128485 A1 | 7/2003 | Matsumoto | |
| 2006/0125448 A1 | 6/2006 | Okui | 320/19 |
| 2007/0228834 A1 | 10/2007 | Hirahara | 307/66 |

FOREIGN PATENT DOCUMENTS

| | | |
|---|---|---|
| JP | 11-220871 | 8/1999 |
| JP | 11-252907 | 9/1999 |
| JP | 2003-134808 | 5/2003 |
| JP | 2003169471 | 6/2003 |
| JP | 2004-236460 | 8/2004 |

FIG. 4B
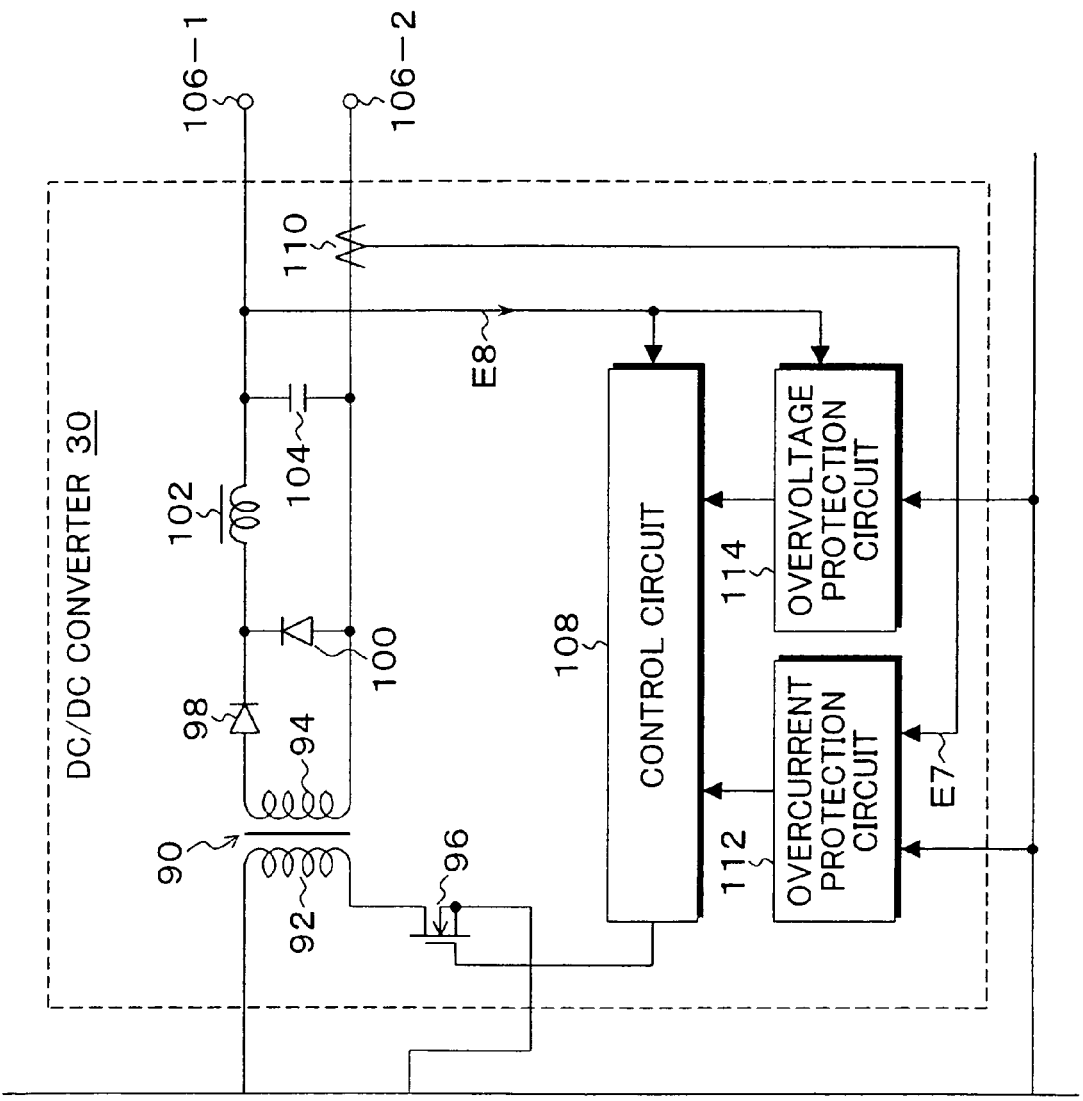

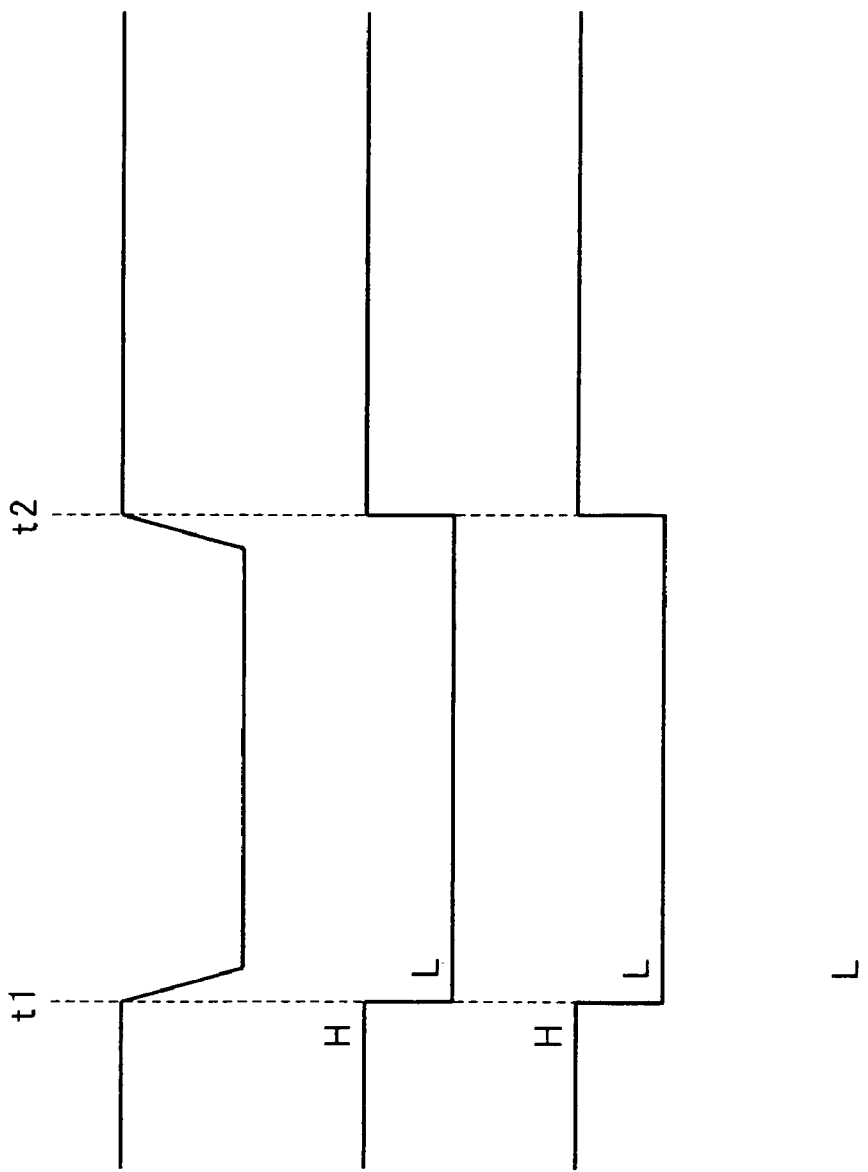

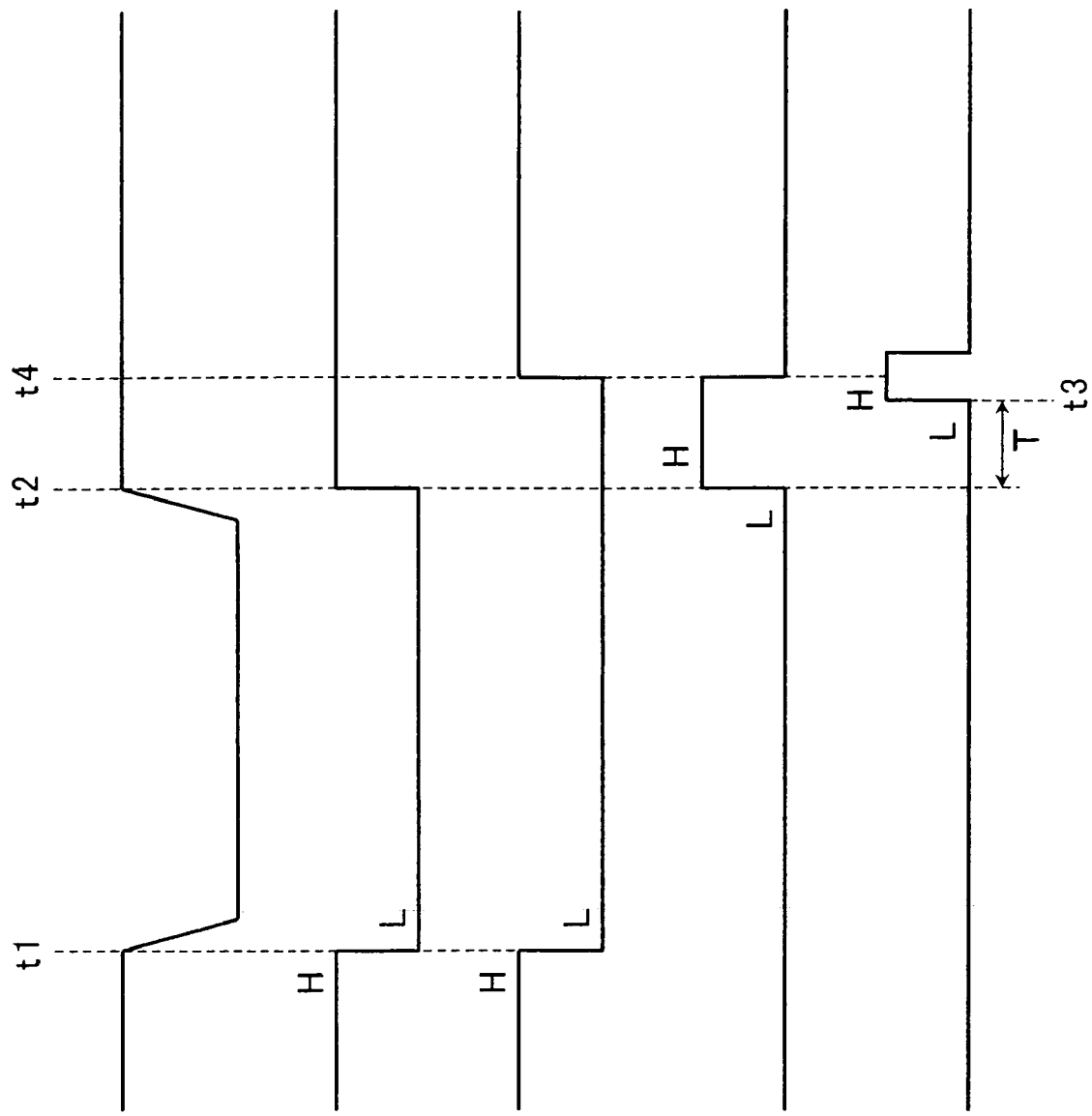

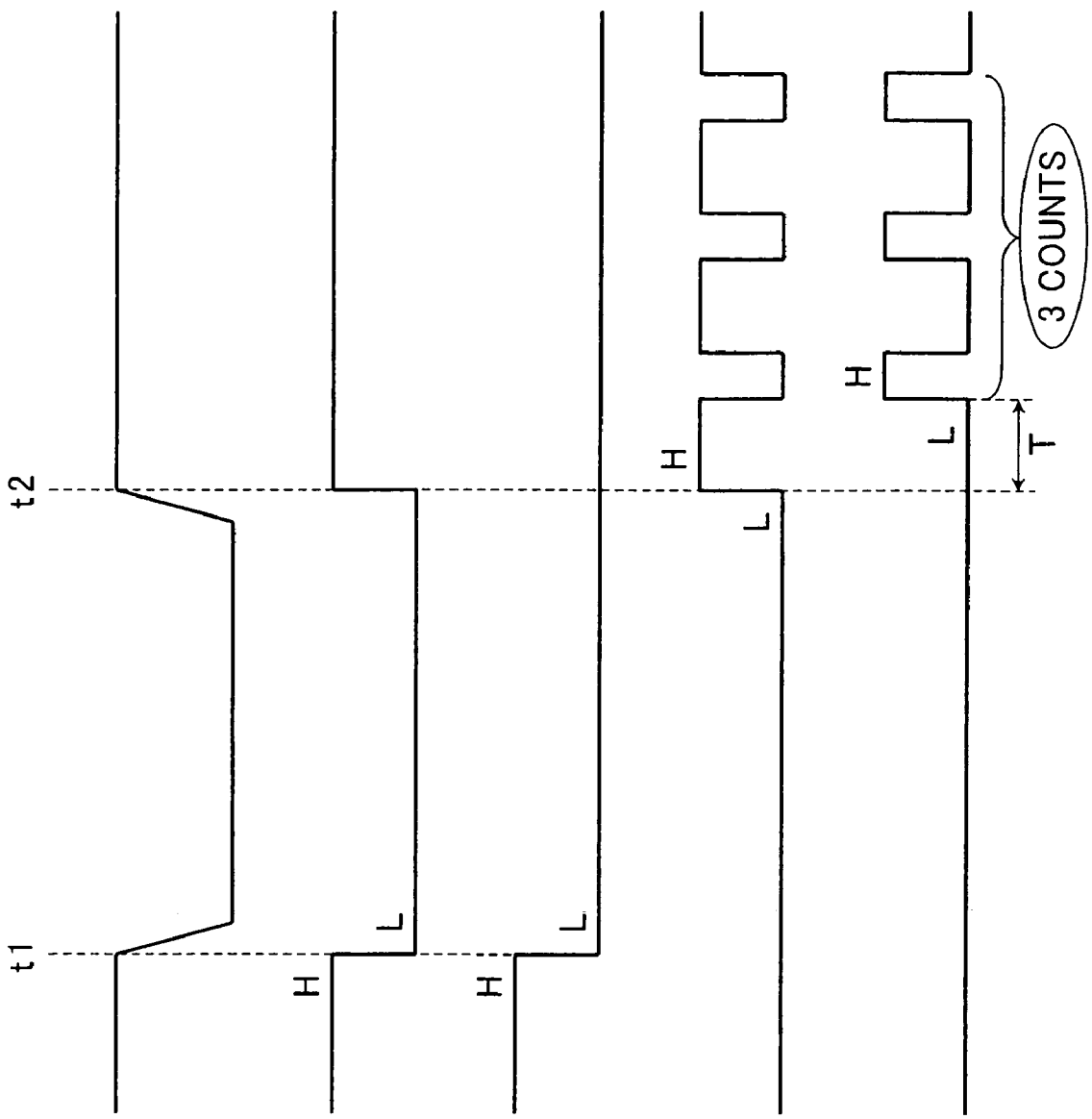

US 8,084,886 B2

UNINTERRUPTIBLE POWER SUPPLY APPARATUS

RELATED APPLICATIONS

This application is a Continuation-in-Part of U.S. application Ser. No. 11/698,112, filed Jan. 26, 2007 now abandoned, which application claims Priority under 35 U.S.C. §119 of Japanese Application No. 2006-088676, filed Mar. 28, 2006, in Japan, the entire contents of which are incorporated herein by reference.

BACKGROUND OF THE INVENTION

1. Field of the Invention

The present invention relates to an uninterruptible power supply device having an AC/DC converter that converts input alternating current power to direct current power and supplies it to a load combined with a battery for backup, and particularly relates to an uninterruptible power supply device that enables automatic reactivation even when the AC/DC converter is stopped due to a protection operation against surge or the like upon alternating current power turn-on.

2. Description of the Related Arts

Conventionally, for example, the device of FIG. 1 is known as an uninterruptible power supply device built in a small private branch exchange.

In FIG. 1, the uninterruptible power supply device 200 has an AC/DC converter 202, and a power factor improving circuit (PFC: Power Factor Controller) 204 and a DC/DC converter 206 are provided in the AC/DC converter 202. The AC/DC converter 202 is supplied with AC 100 volts or AC 200 volts when an AC plug 208 is inserted into an electrical outlet of an AC line, and improves the power factor to "1" so as to reduce noise relative to the outside when the phases of the voltage and the current are tuned by the power factor improving circuit 204. The power factor improving circuit 204 uses, for example, a step-up inverter, and therefore the direct current output voltage is generally DC 240 volts or 480 volts. The DC/DC converter 206 stabilizes input direct current power to DC power having a constant voltage such as DC 24 volts or DC 48 volts required for an exchange. A battery 212 for power-outage backup is connected to the output of the AC/DC converter 202 via a switch 210 that is to be turned off when the battery voltage is reduced to below a specified voltage, and it is charged by the output of the AC/DC converter 202. In the secondary side of the AC/DC converter 202, a DC/DC converter 214 is further provided, and, for example, DC 24 volts, DC 5 volts, and DC 3.3 volts required for exchange circuits are stabilized and output. In such uninterruptible power supply device 200, when power outage of the AC power supply of the electrical outlet to which the AC plug 208 is connected occurs or when the AC plug 208 is pulled out in accordance with needs during usage of the exchange, it is switched to supply of the direct current power from the battery 212, and power supply can be maintained. The battery 212 can serve as a backup up to several tens of minutes to several hours during power outage; however, when the time of power outage is long, a transportable diesel engine generator or the like sometimes substitutes for a commercial power supply in order to realize a further long operation. For example, electrical equipment installed in a building or the like has to be periodically inspected. Power outage is sometimes caused for a long time such as for eight hours for the inspection, and back up by the battery 212 is difficult. Therefore, a transportable diesel engine generator is brought in and activated upon power outage, and it is used by inserting the AC plug of the exchange into the electrical outlet of the diesel engine generator.

However, in such conventional uninterruptible power supply device, when the diesel engine generator is prepared upon prolonged power outage, the AC plug of the uninterruptible power supply device is inserted into a connector of the diesel engine generator, and the diesel engine is activated, there has been a problem that the power supply by the battery is continued and the functions of the exchange are suddenly stopped due to battery exhaust even though AC power is supplied from the generator. Such an abnormal situation is caused when distortion is generated in the sine wave of alternating current power due to an inrush current or the like that flows through another device connected to the connector at the same time upon activation of the diesel engine generator, a surge voltage is applied to the AC/DC converter 202, and protection circuits of the power factor improving circuit 204 and the DC/DC converter 206 constituting the AC/DC converter 202 detect the overcurrent or overvoltage due to the surge and stops the operation. There is a problem that the battery 212 is exhausted in this state to stop the exchange, and considerable damage is caused along with stoppage of the exchange. Particularly, since the exchange is stopped even though it is backed up by operating the diesel engine generator, determining the cause takes labor hour and time, and there is a risk of further damage due to the stoppage of the exchange.

SUMMARY OF THE INVENTION

According to the present invention to provide a highly reliable uninterruptible power supply device that can reliably avoid stoppage of power supply due to battery exhaust by automatically cancelling the operation stoppage of the AC/DC converter due to surge or the like upon AC power activation.

The present invention provides an uninterruptible power supply device. The interruptible power supply device of the present invention is characterized by having an AC/DC converter that converts input alternating current power to direct current power and outputting the power to a load;

a battery that is connected to the output side of the AC/DC converter and outputs charged direct current power when the direct current power output by the AC/DC converter is cut;

protection circuits that detect an overcurrent or overvoltage of the AC/DC converter and stop operation of the AC/DC converter;

an input monitoring circuit that monitors the alternating current input of the AC/DC converter and outputs an alternating current input monitor signal;

an output monitoring circuit that monitors the direct current output of the AC/DC converter and outputs a direct current output monitor signal; and a reactivation circuit that outputs a reset signal to the protection circuits so as to reactivate the AC/DC converter when the reactivation circuit determines the state in which the alternating current input is obtained and the direct current output is not obtained based on the alternating current input monitor signal and the direct current output monitor signal upon turn-on of the alternating current power.

The reactivation circuit has a timer circuit that outputs the reset signal to the protection circuits so as to reactivate the AC/DC converter when the state in which the alternating current input is obtained and the direct current output is not obtained is determined and when the determination state is continued for a predetermined time.

The reactivation circuit has a counter circuit that counts the reset signal output to the protection circuits and stops the output of the reactivation signal when it is counted a predetermined number of times.

The AC/DC converter has a power factor improving circuit that performs switching such that a current phase is matched with a voltage phase obtained by inputting the alternating current power and subjecting the power to full-wave rectification, and a DC/DC converter that stabilizes the direct current power output by the power factor improving circuit to a specified direct current voltage and outputs the voltage; and the protection circuits are overcurrent protection circuits and overvoltage protection circuits respectively provided in the power factor improving circuit and the DC/DC converter.

The AC/DC converter has another DC/DC converter or DC/AC converter that stabilizes a plurality types of direct current voltages and outputs them to the secondary side of the DC/DC converter, and the battery is connected between the DC/DC converter or the DC/AC converter.

The AC/DC converter has a plug that can be attached to and detached from an electrical outlet connected to an alternating current power supply line. The load of the AC/DC converter is, for example, a private branch exchange.

In the uninterruptible power supply device of the present invention, more specifically, the input monitoring circuit has a first comparator circuit that compares the alternating current input voltage with a predetermined reference voltage, outputs a H-level signal if the voltage is equal to or more than the reference voltage, and outputs a L-level signal if the voltage is less than the reference voltage;

the output monitoring circuit has a second comparator circuit that compares the direct current output voltage with a predetermined reference voltage, outputs a H-level signal if the voltage is equal to or more than the reference voltage, and outputs a L-level signal if the voltage is less than the reference voltage;

the reactivation circuit has a first AND circuit that outputs a signal obtained as AND of the output signal of the first comparator circuit and an inverted output signal that is inversion of the output signal of the second comparator circuit;

a timer circuit that is activated when the output signal of the first AND circuit rises to the H level and outputs a timer signal after a predetermined time;

a one-shot circuit that is triggered by output of the timer signal so as to output the reset signal having predetermined duration to the protection circuits;

a counter that counts the reset signal output from the one-shot circuit and outputs a prohibition signal when the number reaches a predetermined value; and a second AND circuit that prohibits output of the timer signal from the timer circuit to the one-shot circuit by the prohibition signal output from the counter.

According to the uninterruptible power supply device of the present invention, when the AC/DC converter is abnormally stopped by a protection operation in response to surge or the like upon power recovery of AC power supply after power outage, the stoppage of the AC/DC converter is determined by monitoring the alternating current input and the direct current output, and the protection circuits are reset, thereby automatically performing reactivation, preventing a trouble that the AC/DC converter is lead to power supply stoppage due to power supply continued from the battery even though AC power is normally supplied, and ensuring high reliability.

When abnormal stoppage by the protection operation is determined, the AC/DC converter is reactivated by the timer circuit when the abnormal stoppage is continued for a predetermined time, thereby preventing unnecessary reactivation with erroneous determination of the abnormal operation due to noise or the like.

Although it is reactivated even when it is stopped by a protection operation caused by an overcurrent or overvoltage, the protection operation of the overcurrent or overvoltage is repeated and it is stopped in this case even when it is reactivated. Therefore, the number of reactivation is counted by the counter circuit, further reactivation is prohibited when it reached a predetermined number of times, and damage of the circuit caused by repeating reactivation in the state of overcurrent or overvoltage can be prevented. The above and other objects, features, and advantages of the present invention will become more apparent from the following detailed description with reference to the drawings.

BRIEF DESCRIPTION OF THE DRAWINGS

FIGS. 4A and 4B are circuit block diagrams showing an embodiment of the power factor improving circuit and the DC/DC converter of FIGS. 3A and 3B;

FIGS. 5A to 5D are time charts of a case in which power is normally recovered;

FIGS. 6A to 6E are time charts of a case in which it is abnormally stopped upon power recovery and reactivated; and FIGS. 7A to 7E are time charts of a case in which it is stopped by a protection operation due to circuit failure upon power recovery.

DETAILED DESCRIPTION OF THE PREFERRED EMBODIMENTS

Figure 1:
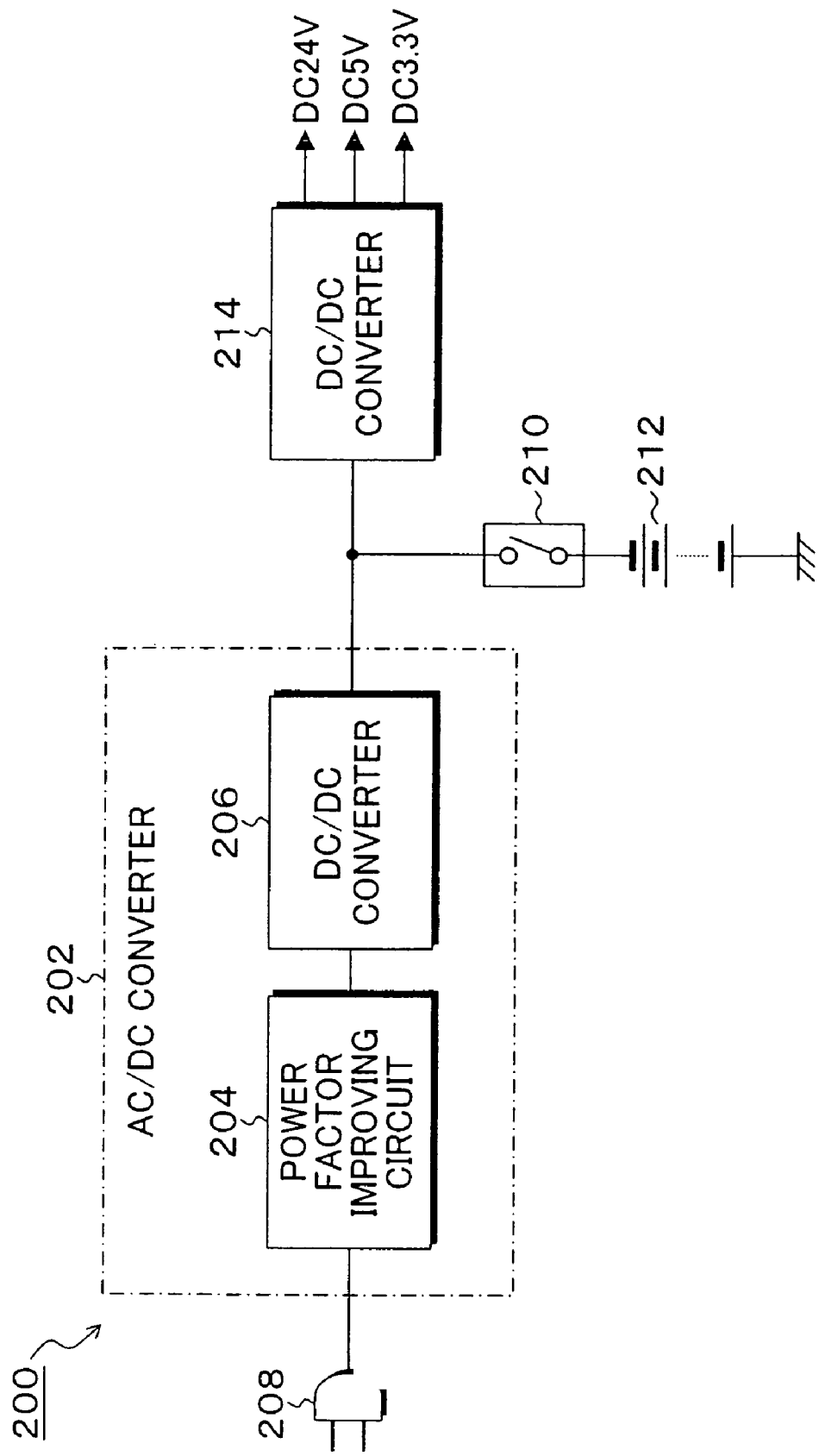
FIG. 1 is an explanatory diagram of a conventional uninterruptible power supply device.
Figure 2:
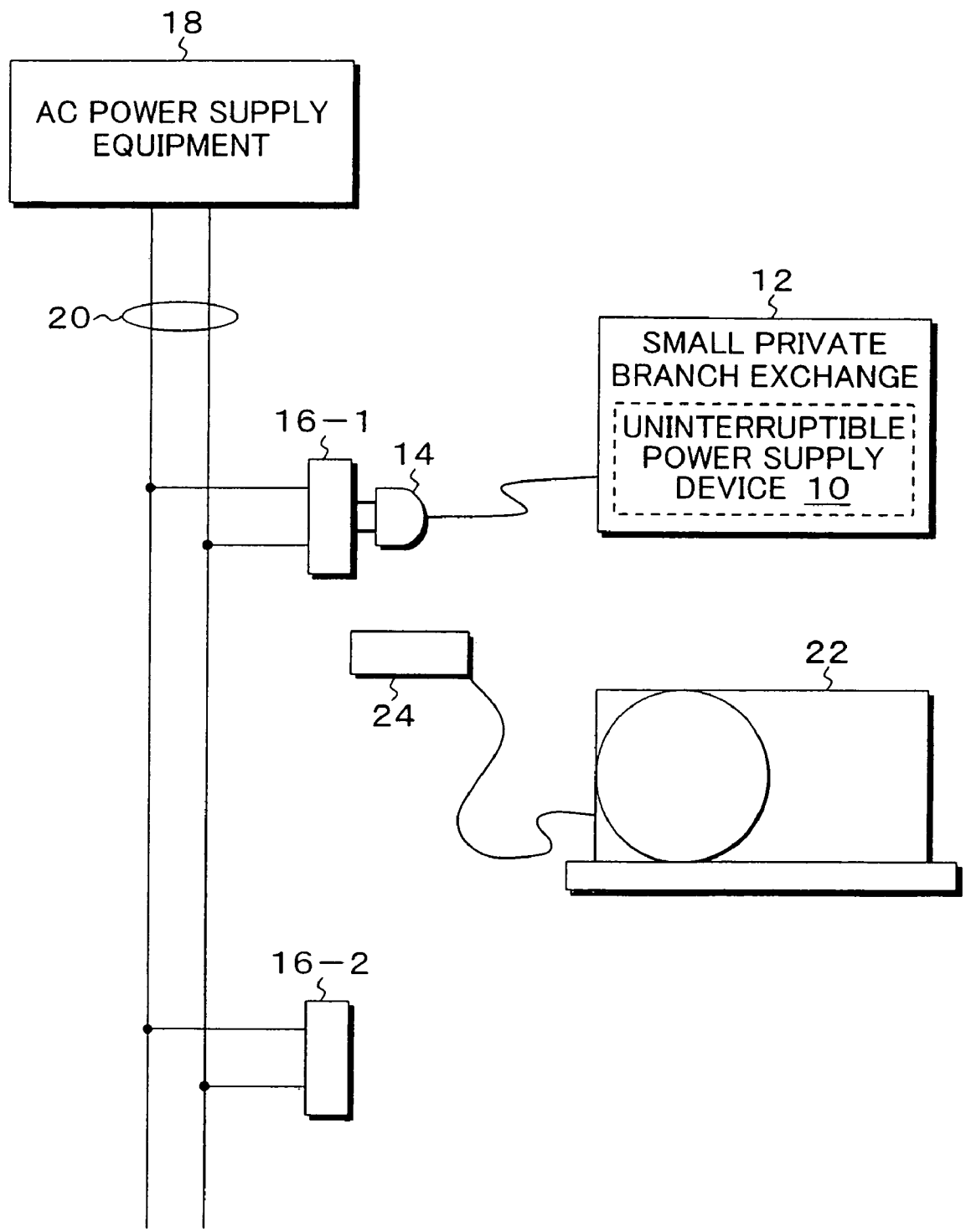
FIG. 2 is an explanatory diagram of an equipment environment to which the present embodiment is applied.

FIG. 2 is an explanatory diagram of an equipment environment in which an uninterruptible power supply device according to an embodiment of the present invention is used. In FIG. 2, the uninterruptible power supply device 10 of the present embodiment is built in a small private branch exchange 12 installed on a floor of a building or the like and supplied with AC power by inserting an AC plug 14 that is lead to outside into an electrical outlet 16-1 that is connected to an AC line 20 lead from alternating current power supply equipment 18. The small private branch exchange 12 having the uninterruptible power supply device 10 of the present embodiment has to be operated all the time even if power supply by the alternating power supply equipment 18 is stopped; therefore, upon power outage, it is operated by a battery built in the uninterruptible power supply device 10 of the present embodiment. In the usage environment like FIG. 2, sometimes the alternating current power supply equipment 18 is caused to be in a power outage state for a long time such as eight hours or more for example in an annual periodical inspection. In such a case, the battery built in the uninterruptible power supply device 10 of the present embodiment cannot fully back it up; therefore, the operation of the small private branch exchange 12 is compensated in the power outage state of the alternating current power-supply equipment 18 over a long time by bringing in a diesel engine generator 22 to the installation site of the small private branch exchange 12, reinserting the AC plug 14 of the uninterruptible power supply device 10 into a connector 24 thereof, and activating the engine.

Figure 3A:
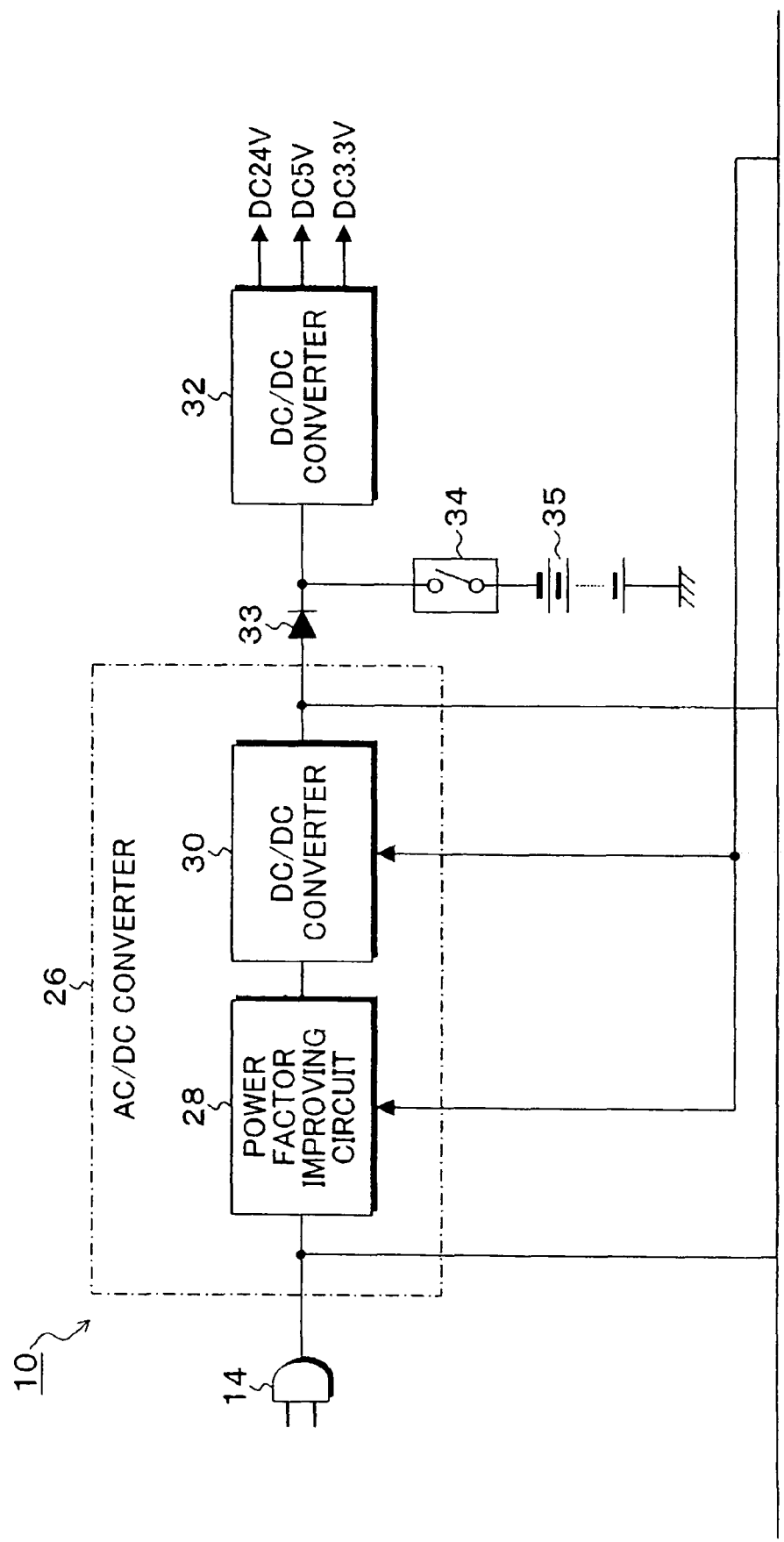
FIGS. 3A and 3B are circuit block diagrams showing an embodiment of an uninterruptible power supply device according to the present invention.
Figure 3B:
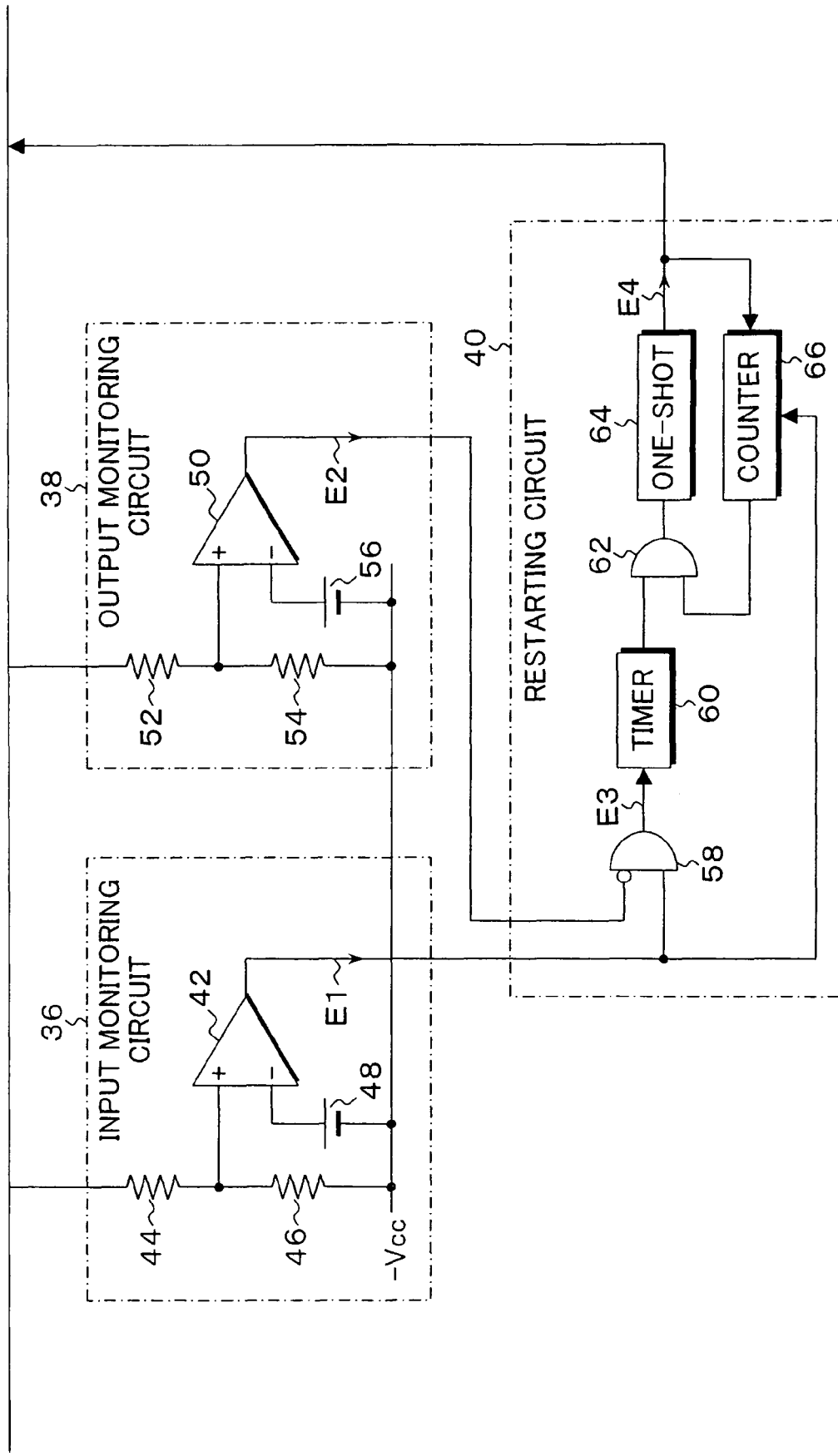

FIGS. 3A and 3B are block diagrams showing a circuit configuration of the uninterruptible power supply device 10 according to the present embodiment. In FIGS. 3A and 3B, the uninterruptible power supply device 10 of the present embodiment has an AC/DC converter 26, and a power factor improving circuit 28 and a DC/DC converter 30 are provided in the AC/DC converter 26. When the AC plug 14 is inserted into the electrical outlet 16-1 as shown in FIG. 2, AC 100 volts or AC 200 volts are supplied to the power factor improving circuit 28. The power factor improving circuit 28 performs switching such that the current phase is matched with the phase of the rectified voltage obtained by a built-in full-wave rectifier circuit, and improves the power factor such that it approaches 1, thereby preventing leakage of switching noise with respect to the alternating current power supply equipment side. A step-up converter is used as the power factor improving circuit 28 in the present embodiment; therefore, the power factor improving circuit 28 outputs DC 240 volts with respect to input of AC 100 volts and outputs DC 300 volts with respect to input of AC 200 volts. DC 200 volts or DC 300 volts from the power factor improving circuit 28 are input to the DC/DC converter 30, and the converter outputs a stabilized constant direct-current voltage, for example, DC 24 volts or DC 48 volts necessary for the small private branch exchange 12 of FIG. 2. Subsequent to the AC/DC converter 26, a DC/DC converter 32 is provided in the present embodiment. The direct current output from the DC/DC converter 30 is input to the DC/DC converter 32, and the converter stabilizes and outputs, for example, DC 24 volts, DC 5 volts, or DC 3.3 volts as a direct current power supply voltage necessary for an exchange circuit of the small private branch exchange 12 of FIG. 2. The DC/DC converter 32 is provided in the output side of the AC/DC converter 26 in the present embodiment. However, a DC/AC converter may be provided as another embodiment, and, in this case, the uninterruptible power supply device of this embodiment serves as a power supply unit that converts an AC input to another AC output by switching control. A diode 33 is inserted and connected on the output side of the AC/DC converter 26, that is, between the DC/DC converters 30 and 32, and a battery 35 is connected via a switch circuit 34 between the diode 33 and the DC/DC converter. The battery 35 can ensure power supply time corresponding to the battery capacity. In a loaded state in which the usage rate of the small private branch exchange 12 is high, power supply can be continued for about several tens of minutes; and, in a no-load state in which the frequency of use is low, it can be backed up by supplying power for about several hours. The switch circuit 34 connected to the battery 35 in series is a switch that prevents battery breakage due to low battery caused by discharge of the battery 35; and, when the battery voltage of the battery 35 is reduced to equal to or less than a predetermined voltage, the switch circuit detects that, turns off the switch by a control circuit that is not shown, and separates the battery 35 from the load side. In the present embodiment, an input monitoring circuit 36, an output monitoring circuit 38, and a reactivation circuit 40 are further provided for the main circuit side that is composed of the AC/DC converter 26, the DC/DC converter 32, and the battery 35. The input monitoring circuit 36 monitors alternating current input to the AC/DC converter 26 and outputs an alternating current input monitor signal E1. More specifically, the input monitoring circuit 36 has a comparator circuit (first comparator circuit) 42, inputs an alternating current voltage that is divided by resistances 44 and 46 to the positive input terminal of the comparator circuit 42, and compares it with a reference voltage of a reference voltage supply 48 that is connected to the negative input terminal thereof. If the alternating current input voltage exceeds the reference voltage of the reference voltage supply 48, the comparator circuit 42 outputs an alternating current input monitor signal E1 that is at a H level. If the alternating current input voltage is below the reference voltage, i.e., when a power outage state is caused, the comparator 42 outputs an alternating current input monitor signal E1 that is at a L level. The output monitoring circuit 38 has a comparator circuit (second comparator circuit) 50, applies the output voltage of the DC/DC converter 30 that is divided by resistances 52 and 54 to the positive input terminal thereof, and compares it with the reference voltage of a reference voltage supply 56 that is connected to the negative input terminal thereof. The comparator circuit 50 outputs an output monitor signal E2 that is at the H level if the direct current output voltage of the DC/DC converter 30 exceeds the reference voltage of the reference voltage supply 56 and outputs a direct current output monitor signal E2 that is at the L level if it is below the reference voltage. The reactivation circuit 40 is composed of an AND circuit (first AND circuit) 58, a timer circuit 60, an AND circuit (second AND circuit) 62, a one-shot circuit 64, and a counter circuit 66. The AND circuit 58 obtains the logical multiplication of the input monitor signal E1 and the inverted input of the output monitor signal E2, and, based on this, determines an abnormal stop state in which the output voltage of the AC/DC converter 26 is cut in the state in which the alternating input voltage is normally obtained. More specifically, the input monitor signal E1 is at the H level when the alternating current input voltage is normally obtained. Meanwhile, the output monitor signal E2 is at the L level when the direct current output voltage is cut due to stoppage of the AC/DC converter 26, and this is inverted to the H level by the inverting function of the input. As a result, the AND circuit 58 determines the abnormality in which output is stopped in the state in which the alternating current input of the AC/DC converter 26 is obtained and generates a H-level output as an abnormality determination signal E3. The abnormality determination signal E3 from the AND circuit 58 is input to the timer circuit 60 that outputs a H-level timer signal after a predetermined time T that is set in advance. The timer signal from the timer circuit 60 is input to the one-shot circuit 64 via the AND circuit 62. The output signal of the counter 66 is fed to the other input of the AND circuit 62. In the initial state, since the output signal of the counter 66 is at the H level, the AND circuit 62 is in a permissive state; therefore, the timer output signal that is from the timer 60 and based on the abnormality determination signal E3 is input to the one-shot circuit 64 without change. When the H-level timer output signal is input thereto from the AND circuit 62, the one-shot circuit 64 outputs a reset signal E4 having predetermined duration to protection circuits built in the power improving circuit 28 and the DC/DC converter 30 provided in the AC/DC converter 26 and cancels the stopped operation by resetting the protection circuits so as to reactivate them. The counter circuit 66 counts the reset signal E4 that is output from the one-shot circuit 64. The counter circuit 66 is reset by the H level of the input monitor signal E1, counts the reset signal E4 from the one-shot circuit 64 that is obtained after that, and, when it reaches a predetermined value that is set in advance, for example, 3 counts, and changes the counter output signal for the AND circuit 62 from the previous H level to the L level. When the output signal of the counter circuit 66 is at the L level, the AND circuit 62 is caused to be in a prohibited state, the abnormality determination signal E3 obtained via the timer circuit prevented from being input to the one-shot circuit 64, and the reactivation operation of resetting the protection circuits in the AC/DC converter 26 by the output of the reset signal E4 after the three counts is prohibited.

Figure 4A:
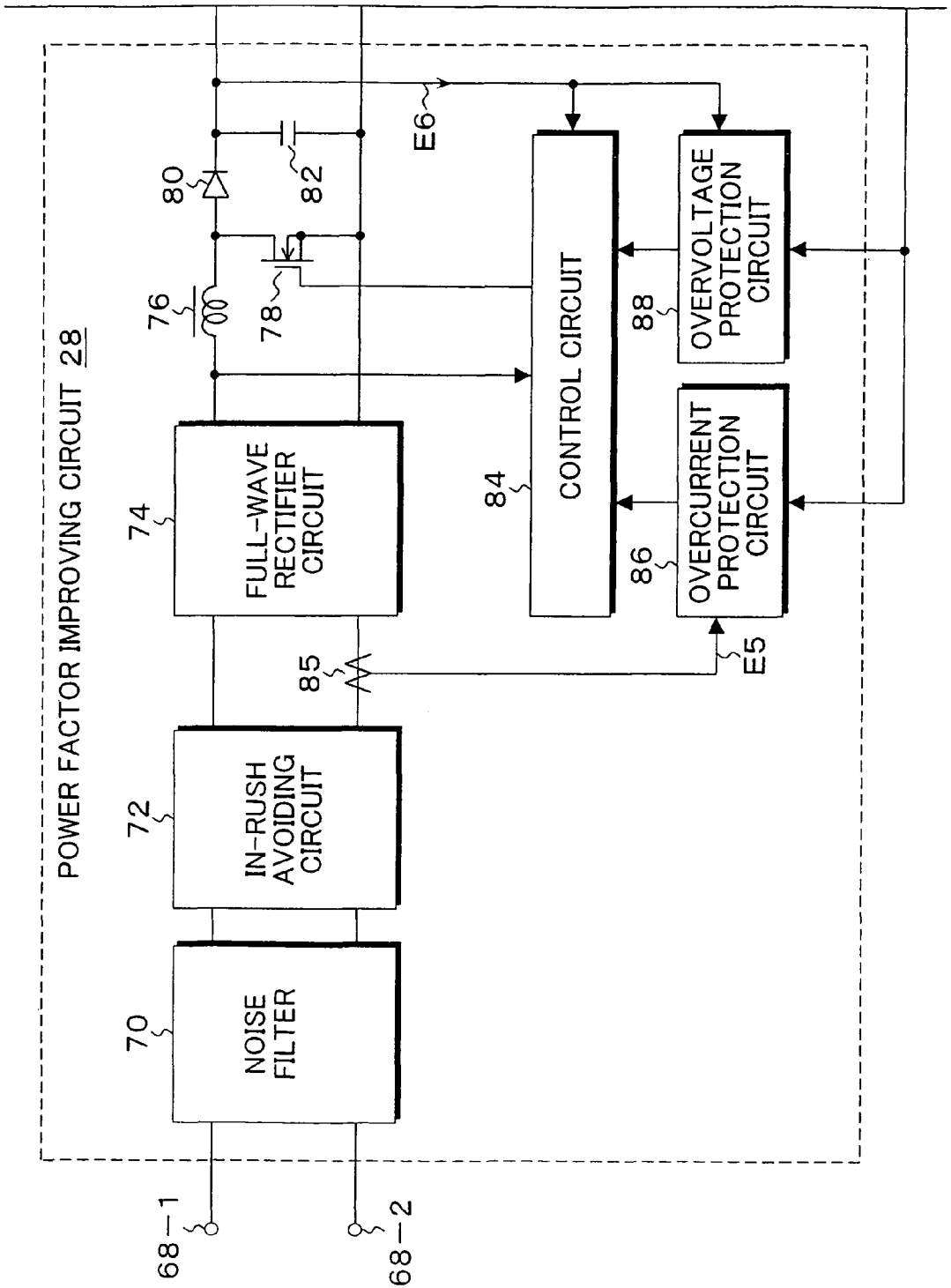

FIGS. 4A and 4B are circuit block diagrams showing an embodiment of the power factor improving circuit 28 and the DC/DC converter 30 provided in the AC/DC converter 26 of FIGS. 3A and 3B. In FIGS. 4A and 4B, the power factor improving circuit 28 has, subsequent to alternating current input terminals 68-1 and 68-2, a noise filter 70, an in-rush avoiding circuit 72, a full-wave rectifier circuit 74, a step-up choking coil 76, a switch element 78 using a MOS-FET or the like, a diode 80 for rectification, and a capacitor 82 for smoothing. In addition, a control circuit 84 for switching control of the switch element 78 is provided, and an overcurrent protection circuit 86 and an overvoltage protection circuit 88 are provided for the control circuit 84. A current detection signal E5 from a current transformer (CT) 85 provided in the primary side of the full-wave rectifier circuit 74 and an output voltage detection signal E6 that is the output voltage from the capacitor 82 for smoothing are input to the control circuit 84. The control circuit 84 switches the switch element 78 to cause a switching current to flow such that it is matched with the phase of the full-wave rectified wave undergone full-wave rectification in the full-wave rectifier circuit 74, and controls the power factor such that it approaches "1" by matching the phases of the full-wave rectified voltage and the current as a mean current of the switching current. The overcurrent protection circuit 86 detects an overcurrent that flows in the power factor improving circuit 28 and stops the switching operation of the switch element 78 that is performed by the control circuit 84. The overvoltage protection circuit 88 similarly stops operation of the control circuit 84 when an overvoltage is detected from the output voltage of the power factor improving circuit 28 and stops the switch element 78. The DC/DC converter 30 is composed of a transformer 90 having a primary coil 92 and a secondary coil 94, a switch element 96 connected in series with the primary coil 92, diodes 98 and 100 for rectification connected to the secondary coil 94, a choke coil 102 for smoothing, and a capacitor 104 for smoothing. A control circuit 108 is provided for the main circuit side. An output voltage for direct current output terminals 106-1 and 106-2 is input thereto by an output voltage detection signal E8, the primary side is subjected to internal isolation with respect to the secondary side, and then, the circuit performs switching control (PWM control) of the switch element 96 such that the output voltage is maintained to a constant voltage. An overcurrent protection circuit 112 and an overvoltage protection circuit 114 are provided for the control circuit 108. A current detection signal E7 detected by a current transformer (CT) 110 provided in the output side is input to the overcurrent protection circuit 112. When an overcurrent is determined, the overcurrent protection circuit 112 stops the control circuit 108 and stops the operation of the switch element 96 that is performed by switching. An output voltage detection signal E8 is input to the overvoltage protection circuit 114. When an overvoltage is detected, the overvoltage protection circuit 114 stops the control circuit 108 and stops the operation of the switch element 96 that is performed by switching.

The reset signal E4 output from the reactivation circuit 40 of FIGS. 3A and 3B is input to the overcurrent protection circuits 86 and 112 and the overvoltage protection circuits 88 and 114 provided in such power factor improving circuit 28 and the DC/DC converter 30. When the H-level reset signal E4 is input, the protection operation is cancelled, and the power factor improving circuit 28 and the DC/DC converter 30 are activated.

FIGS. 5A to 5D are time charts of the case in which they are normally activated after power outage in the embodiment of FIGS. 3A and 3B. FIG. 5A shows the alternating current input, FIG. 5B shows the input monitor signal E1, FIG. 5C shows the output monitor signal E2, and FIG. 5D shows the reset signal E4. In FIGS. 5A to 5D, when power outage in which the alternating current input is stopped is generated at time t1, both the input monitor signal E1 and the output monitor signal E2 are caused to be at the L level. Thereafter, when power recovery in which the alternating current input is recovered is performed at time t2, both the input monitor signal E1 and the output monitor signal E2 are caused to be at the H level since it is normally activated in this case. As a result, the reset signal E4 is not output but remains at the L level.

FIGS. 6A to 6E are time charts of reactivation of the case in which a protection operation of an overcurrent or an overvoltage is performed in response to a surge upon power recovery at the time t2 of FIGS. 5A to 5D. FIGS. 6A to 6C are same as FIGS. 5A to 5D; however, the abnormality determination signal E3 output from the AND circuit 58 of FIGS. 3A and 3B is further shown as FIG. 6D. FIG. 6E is the reset signal E4 that is same as FIG. 5D. In FIGS. 6A to 6E, when power recovery in which the alternating current input is recovered at the time t2 is performed after the power outage in which the alternating current input is cut is caused at the time t1, the input monitor signal E1 accordingly rises from the L level to the H level. Meanwhile, if at least any one of the overcurrent protection circuits 86 and 112 and the overvoltage protection circuits 88 and 114 of either one of or both the power factor improving circuit 28 and the DC/DC converter 30 performs a protection operation due to a surge or the like upon power recovery at the time t2, the power factor improving circuit 28 or the DC/DC converter 30 that has performed the protection operation stops operation, and the direct current output voltage from the DC/DC converter 30 is cut. Therefore, the output monitor signal E2 of FIGS. 6A to 6E maintained at the L level even when the power is recovered at the time t2. Since the input monitor signal E1 at this point is H level, and the output monitor signal E2 is inverted to the H level at the input to the AND circuit 58; therefore, the abnormality determination signal E3 from the AND circuit 58 at the time t2 when the power is recovered rises from the previous L level to the H level. When the abnormality determination signal E3 rises to the H level, the timer 60 is activated, and, when the abnormality determination signal E3 is continuously maintained at the H level during a set time T of the timer 60, the timer 60 outputs a timer signal that is at the H level at the time t3 after T is elapsed. The timer signal is input to the one-shot circuit 64 through the AND circuit 62 that is caused to be in the permissive state by the counter output signal of the counter circuit 66 that is at the L level, and the one-shot circuit 64 outputs the reset signal E4 having predetermined duration for reactivation to the power factor improving circuit 28 and the DC/DC converter 30 at the time t3. In response to the reset signal E4, the protection circuits in the operating state are reset, and the stopped power factor improving circuit 28 and/or the DC/DC converter 30 are accordingly reactivated. The output monitor signal E2 rises to the H level when the direct current output voltage is obtained at the time t4. By virtue of this reactivation of automatically cancelling the abnormal stoppage due to surge or the like upon power recovery, the direct current power can be normally supplied from the AC/DC converter 26 to the load side via the DC/DC converter 30.

FIGS. 7A to 7E are time charts of the case in which an overcurrent or an overvoltage caused by circuit failure of the power factor improving circuit 28 or the DC/DC converter 30 in the AC/DC converter 26 upon power recovery after power outage is detected, and a protection operation is performed. In FIGS. 7A to 7E, after power outage in which the alternating current input is cut at the time t1 occurs, power recovery in which the alternating current input is recovered is performed at the time t2, and it is assumed that, at this point, for example, the overcurrent protection circuit 86 of FIGS. 4A and 4B operates due to circuit failure of the power factor improving circuit 28, the control circuit 84 is stopped, and the direct current output of the power factor improving circuit 28 is stopped. Also for such output stoppage accompanying circuit failure of the power factor improving circuit 28, the AND circuit 58 causes the abnormality determination signal E3 to be at the H level when the input monitor signal E1 is at the H level and the output monitor signal E2 is at the L level at the time t2, and it is delayed for the predetermined time T by the timer 60. Then, the one-shot circuit 64 is triggered, and the reset signal E4 for reactivation is output to the power factor improving circuit 28 and the DC/DC converter 30. However, since the overcurrent protection circuit 86 of the power factor improving circuit 28 is performing a protection operation due to circuit failure, even when the overcurrent protection circuit 86 is reset by the reset signal E4 from the reactivation circuit 40 and the control circuit 84 is reactivated, an overcurrent state is caused again, and the control circuit 84 is stopped by the protection operation performed by the overcurrent protection circuit 86. Therefore, the AND circuit 58 causes the abnormality determination signal E3 to be at the L level because of reactivation by the reset signal E4. Then, it is caused to be at the H level when the protection operation for the overcurrent is performed again, and the reset signal E4 is output again from the one-shot circuit 64 after delay of the time T of the timer 60. In this course, the counter circuit 66 counts the reset signal E4 output from the one-shot circuit 64 and causes the counter output signal to be at the L level for example when it reaches three counts so as to cause the AND circuit 62 to be in a prohibited state. Thereafter, the counter circuit prohibits input of the timer output signal of the timer 60 accompanying the H-level output of the abnormality determination signal E3 output from the AND circuit 58 to the one-shot circuit 64, thereby preventing spreading of circuit damage caused by repeating reactivation of the power factor improving circuit 28 that is stopped due to overcurrent protection and safely maintaining stopped state. In the present embodiment, as shown in the circuit block diagram of FIGS. 3A and 3B, a hardware configuration composed of circuit elements serving as the input monitoring circuit 36, the output monitoring circuit 38, and the reactivation circuit 40 is employed as an example; however, the circuits of monitoring and reactivation can be realized as firmware functions based on programs using processors, etc. The present embodiment employed the uninterruptible power supply device used in power supply of the small private branch exchange as an example; however, the uninterruptible power supply device of the present embodiment can be applied to arbitrary devices without modification. The present invention is not limited to the above described embodiment, includes arbitrary modifications that do not impair the object and advantages thereof, and is not limited by the numerical values shown in the above described embodiment.

What is claimed is:

1. An uninterruptible power supply device, characterized by having
   an AC/DC converter that converts input alternating current power to direct current power and outputs the power to a load;
   a diode that is inserted between the output side of the AC/DC converter and the load;
   a battery that is connected to the cathode of the diode and outputs charged direct current power when the direct current power output of the AC/DC converter is cut;
   protection circuits that detect an overcurrent or overvoltage of the AC/DC converter and stop operation of the AC/DC converter;
   an input monitoring circuit that monitors the alternating current input of the AC/DC converter and outputs an alternating current input monitor signal;
   an output monitoring circuit that is connected between the AC/DC converter and the diode, and monitors the direct current output of the AC/DC converter and outputs a direct current output monitor signal; and
   a reactivation circuit that outputs a reset signal to the protection circuits so as to reactivate the AC/DC converter when the reactivation circuit determines the state in which the alternating current input is present and the direct current output is not present based on the alternating current input monitor signal and the direct current output monitor signal upon turn-on of the alternating current power.

2. The uninterruptible power supply device according to claim 1, characterized in that the reactivation circuit has a timer circuit that outputs the reset signal to the protection circuits so as to reactivate the AC/DC converter when the state in which the alternating current input is present and the direct current output is not present is determined and when the state is continued for a predetermined time.

3. The uninterruptible power supply device according to claim 1, characterized in that the reactivation circuit has a counter circuit that counts the reset signal output to the protection circuits and stops the output of the reactivation signal when it is counted a predetermined number of times, and wherein the reset signal is a pulse signal.

4. The uninterruptible power supply device according to claim 1, characterized in that
   the AC/DC converter has a power factor improving circuit that performs switching such that a current phase is matched with a voltage phase present by inputting the alternating current power and subjecting the power to full-wave rectification, and a second DC/DC converter that stabilizes the direct current power output by the power factor improving circuit to a specified direct current voltage and outputs the voltage; and
   the protection circuits are overcurrent protection circuits and overvoltage protection circuits respectively provided in both the power factor improving circuit and the DC/DC converter.

5. The uninterruptible power supply device according to claim 1, characterized in that the AC/DC converter has a plug that can be attached to and detached from an electrical outlet connected to an alternating current power supply line.

6. The uninterruptible power supply device according to claim 1, characterized in that the load of the AC/DC converter is a private branch exchange.

7. The uninterruptible power supply device according to claim 1, characterized in that
   the input monitoring circuit has a first comparator circuit that compares the alternating current input voltage with a predetermined reference voltage, outputs a H-level signal if the voltage is equal to or more than the reference voltage, and outputs a L-level signal if the voltage is less than the reference voltage;

the output monitoring circuit has a second comparator circuit that compares the direct current output voltage with a predetermined reference voltage, outputs a H-level signal if the voltage is equal to or more than the reference voltage, and outputs a L-level signal if the voltage is less than the reference voltage;

the reactivation circuit has a first AND circuit that outputs a signal present as AND of the output signal of the first comparator circuit and an inverted output signal that is inversion of the output signal of the second comparator circuit;

a timer circuit that is activated when the output signal of the first AND circuit rises to the H level and outputs a timer signal after a predetermined time;

a one-shot circuit that is triggered by output of the timer signal so as to output the reset signal having predetermined duration to the protection circuits;

a counter that counts the reset signal output from the one-shot circuit and outputs a prohibition signal when the number reaches a predetermined value; and a second AND circuit that prohibits output of the timer signal from the timer circuit to the one-shot circuit by the prohibition signal output from the counter.

* * * * *